United States Patent Office 2,698,068
Patented Dec. 28, 1954

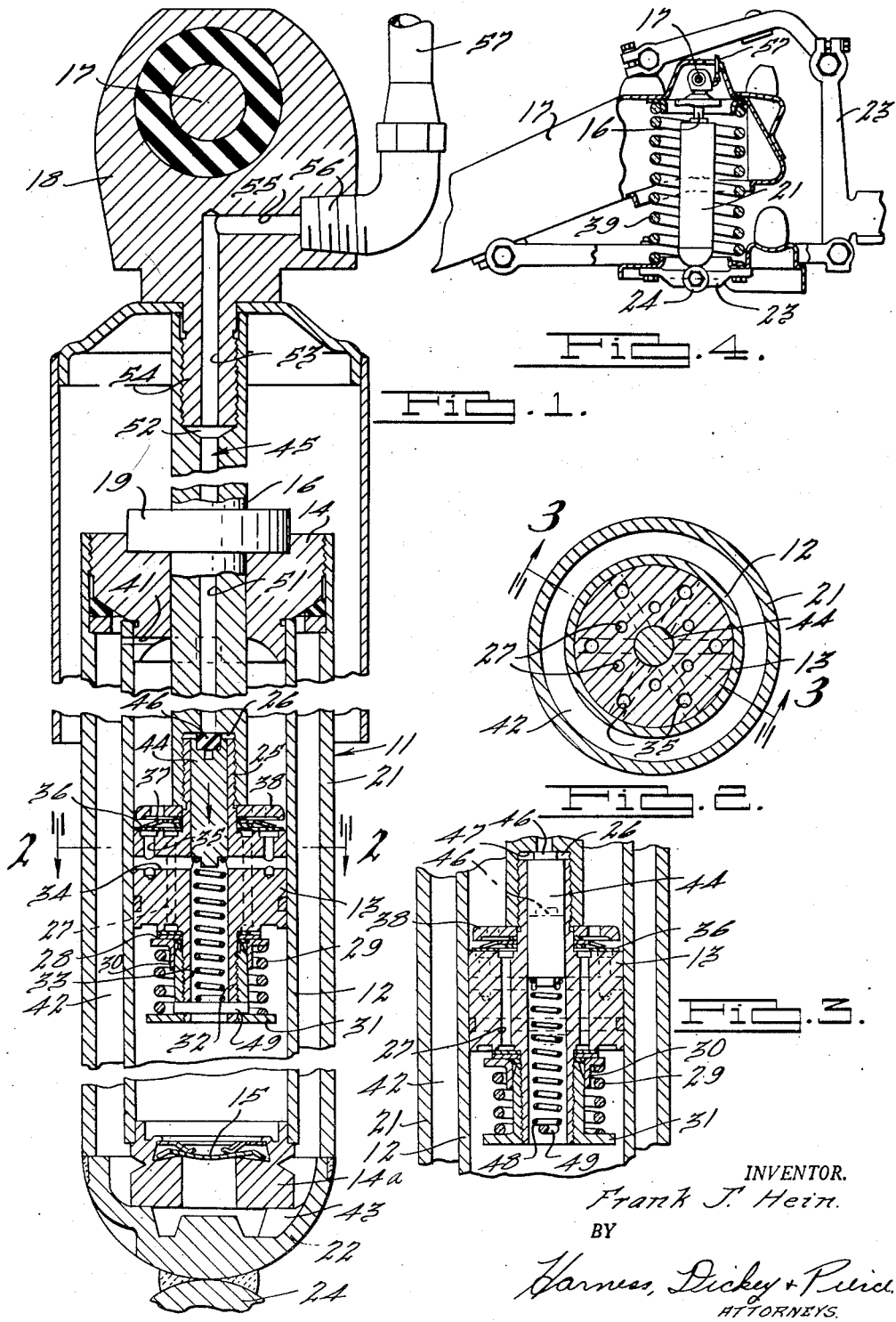
Dec. 28, 1954     F. J. HEIN     2,698,068
VEHICLE DIVE ARRESTER
Filed Nov. 10, 1950
INVENTOR.
Frank J. Hein.
BY
Harness, Dickey & Pierce
ATTORNEYS.

2,698,068

VEHICLE DIVE ARRESTER

Frank J. Hein, Goodells, Mich.

Application November 10, 1950, Serial No. 195,007

1 Claim. (Cl. 188—88)

This invention relates to dive arresters, and particularly to mechanisms designed to prevent unwanted vertical motion in automotive vehicles or the like during deceleration or stopping of such vehicles.

In the conventional automotive vehicle which is provided with shock absorbers at the forward and rear wheel suspensions, a dangerous tendency to "dive" occurs when the vehicle is decelerated or brought to a stop. This diving or vertical downward movement of the front end and upward movement of the rear end of the vehicle is an inherent result of the vehicle construction, wherein the inertia of the body causes the front shock absorbers to move in compression strokes and the rear shock absorbers to move, though to a lesser extent, in rebound strokes. This diving tendency not only causes discomfort to passengers but may also be dangerous upon sudden deceleration, since it causes the passengers to be thrown forward toward the windshield or the front seat.

It is therefore an object of the present invention to provide an efficient means for automatically lessening the diving motion of a vehicle when it is decelerated. More particularly, it is an object to provide means for preventing the compression action of front wheel shock absorbers when the vehicle is decelerated, thus preventing the downward movement of the front end and greatly lessening the vertical movement of the body as a whole.

It is another object to provide a vehicle dive arrester as described above which is particularly adapted for vehicles having hydraulic brake systems and which is actuated automatically and simultaneously with application of the vehicle brakes, the arrester remaining operative only so long as the brakes are applied, and thereafter returning to inoperative position allowing the shock absorbers to operate in the normal manner.

It is also an object to provide a diving arrester mechanism constructed of a minimum number of parts and which is adapted for installation integrally with the conventional type of tubular two-way direct acting fluid type of shock absorber and with the conventional hydraulic brake system.

Other objects, features, and advantages of the present invention will become apparent from the subsequent description taken in conjunction with the accompanying drawing.

In the drawing:

Figure 1 is an elevational view, in cross section, of a shock absorber embodying the elements of this invention;

Fig. 2 is a crosss-sectional view taken along the line 2—2 of Fig. 1 and showing the relation of the piston ports and passages;

Fig. 3 is a fragmentary cross-sectional view taken along the line 3—3 of Fig. 2 and showing the details of the piston valves and associated parts; and Fig. 4 is an elevational view showing the shock absorber in assembled condition on an automotive vehicle, parts being broken away for clarity.

The invention is preferably embodied in a shock absorber 11 which is of the conventional tubular two-way direct acting fluid type, although it will be understood that the principle and elements of this invention are applicable as well to other types of hydraulic shock absorbers. The shock absorber illustrated comprises in general a pressure cylinder 12 filled with shock absorber fluid and within which is slidably mounted a piston 13. The pressure cylinder 12 has a closure 14 at its upper end and is provided with a body 14a at its lower end, the body having a base valve assembly 15 mounted therein.

A piston rod 16 extends through closure 14 and is attached to the sprung assembly 17 of the vehicle by means of a head 18, the closure being provided with sealing means 19 to prevent fluid flow past the piston rod. A reserve chamber 21 is threadably secured at its upper end to closure 14 and extends downwardly concentric with cylinder 12, the closed lower end 22 of the reserve chamber being secured to the unsprung assembly 23 of the vehicle by means of a head 24.

The piston 13 is secured to rod 16 by means of an extension 25 on the upper end of the piston which is threaded into an aperture 26 at the lower end of rod 16. A plurality of inner ports 27 extend axially through the piston 13 between its upper and lower surfaces, and these ports 27 allow passage of the fluid from the upper to the lower portions of cylinder 12 during the upward or rebound stroke of the piston, as limited by check valve 28 at the lower ends of these passages. Valve 28 may be of the laminated disc type, its movement being controlled by coil spring 29 which has its upper end engageable with the valve through a shouldered sleeve 30 and its lower end fixed to the piston by a shouldered sleeve 31 threaded to a lower extension 32 of the piston.

A series of passageways are provided in piston 13 for passage of the fluid from the lower portion to the upper portion during the compression stroke, that is when piston 13 moves downwardly through cylinder 12. In particular, the piston is provided with a concentric axial aperture 33 which extends entirely through the piston including its upper extension 25 and lower etxension 32. Radiating outwardly from aperture 33 at approximately its midpoint are a plurality of passages 34. These passages connect with outer axial ports 35 which lead upwardly from passages 34 to the upper surface of piston 13. A disc valve 36 is normally held against ports 35 by spring 37, a spacing washer 38 being provided between spring 37 and piston rod 16.

The normal operation of the shock absorber will be apparent from the above description. As seen in Fig. 4, the piston rod 16 is secured to the sprung assembly 17 of the vehicle, and the reserve chamber 21, which is rigidly connected with pressure cylinder 12, is secured to the unsprung assembly 23. The conventional coil spring 39 supports the sprung assembly 17 from the unsprung assembly 23. Upon upward movement of the vehicle wheel (not shown) and of assembly 23, cylinder 12 will move upwardly relative to piston 13. Upon this compression movement, fluid will flow from the lower portion of the cylinder upwardly through aperture 33, out through radial passages 34 and upwardly through ports 35, the spring 37 being urged upwardly by the fluid pressure to open valve 36. Valve 28 will remain closed to prevent reverse flow through ports 27. After the compression stroke has been completed, the coil spring 39 will act to force the piston rod 16 into its extended position, and on this rebound stroke valve 36 will close and the fluid will flow downwardly through ports 27 past valve 28, which will be lifted against the force of coil spring 29. It will be noted that the strength of coil spring 29 is relatively greater than that of spring 37, so that the rebound stroke will occur at a substantially slower rate than the preceding compression stroke. It will also be observed that during the compression stroke some of the fluid passing from the lower portion to the upper portion of cylinder 12 will be allowed to bleed through orifice 41 to the reserve chamber 42, and that on the rebound stroke valve 15 will open to allow some fluid to pass from the reserve chamber through a passageway 43 to the lower portion. This will allow for the differences in cross-sectional area of the upper and lower cylinder portions due to the piston rod 16.

The elements of the present invention which are incorporated in the shock absorber structure comprise in general an arresting valve 44 which is slidable within the upper portion of aperture 33, and a channel generally indicated at 45 which connects the upper end of aperture 33 to the hydraulic brake system of the vehicle. The valve 44 is of cylindrical shape and of such length as to correspond with the distance between the upper end of piston extension 25 and the topmost portions of radial passages 34. The upper end of valve 44 is provided with a circular insert 46 of semicompressible material, and this insert is normally urged upwardly against shoulder 47 of aperture 26 by a coil spring 48. The upper end of this spring is engageable with the lower end of the arresting valve, the opposite end of the spring being rigidly supported by a pin 49 extending radially through the lower end of piston extension 32. Channel 45 comprises an axial passage 51 extending through piston rod 16 from the upper end of aperture 26 (contiguous with aperture 33) to an upper threaded aperture 52 in the piston rod. The latter aperture connects with a concentric passage extending through a threaded extension 54 on head 18 which is secured to the piston rod. A passage 55 connects with passage 53 within the head and extends to a nipple connection 56, which in turn is connected by flexible tubing 57 to the hydraulic brake system of the vehicle (not shown), so that channel 45 is at all times filled with hydraulic brake fluid responsive to brake pressure. It will be noted that due to the separation of the brake fluid and the shock absorber fluid system, there is minimum danger of leakage of fluid from one system to the other.

In operation, the arresting valve 44 will normally be held in its uppermost position by spring 48, as shown in Fig. 1. When in this position the valve will not interfere in any way with the normal operation of the shock absorber since a continuous passageway is allowed between the upper and lower surfaces of the piston. It will be noted that when the valve 44 is in its upper position the seating of insert 46 against shoulder 47 will prevent any brake fluid from entering the chamber 26. Upon application of the brakes, fluid pressure will be transmitted through flexible connection 57, through passage 45 and against the upper surface of insert 46. This pressure will overcome the upward force of spring 48, thus moving valve 44 downwardly and cutting off radial passages 34 from the lower portion of aperture 33, as shown by the dot-dash lines in Fig. 3. It will be observed that as long as valve 44 is in its lower position, no fluid will be allowed to pass from the lower portion to the upper portion of cylinder 12. The cylinder 12 and the piston 13 will thus be locked against relative compressing movement, since the fluid trapped below the piston will have no means of escape. Since, as stated previously, the device is preferably installed on the front wheel shock absorbers, the front of the vehicle body will thus be prevented from downward or diving motion as soon as the brakes are applied. It will be observed, however, that since the shock absorbers at the rear wheels tend to act in an upward or rebound stroke when the vehicle is decelerating, the relatively greater strength of spring 29 acting on valve 28 will prevent rapid movement in this direction. The principle of the invention thus need only be applied to the shock absorbers at the front wheels. Upon release of the brake fluid pressure, the spring 48 will immediately urge valve 44 into its upper or inoperative position, thus unblocking passages 34 and again allowing normal operation of the shock absorber 11.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claim.

I claim:

A shock absorber for automotive vehicles and the like comprising a pressure cylinder and a piston and piston rod connected between the sprung and unsprung assemblies of said vehicle, fluid within said pressure cylinder, a check-valve controlled passageway within said piston for allowing said fluid to pass from one side to the other of said piston on a compression stroke thereof, a second check-valve controlled passageway within said piston for allowing said fluid to pass back to the first side of said piston on the rebound stroke of said piston, a cut-off valve within said piston and adjacent said first-mentioned passageway, and movable to and from a position wherein it completely blocks said first-mentioned passageway, a spring normally urging said cut-off valve into an open, non-blocking position, an actuating portion for said cut-off valve, a channel within said piston rod and leading to said actuating portion for the cut-off valve, and means for connecting an outside fluid pressure source to said channel, whereby creation of fluid pressure by said source will move said cut-off valve against the action of said spring into blocking relation with said first-mentioned passageway to prevent said compression stroke.

References Cited in the file of this patent

UNITED STATES PATENTS

| Number | Name | Date |
|---|---|---|
| 1,851,623 | Flader | Mar. 29, 1932 |

FOREIGN PATENTS

| Number | Country | Date |
|---|---|---|
| 290,983 | Great Britain | Nov. 15, 1928 |
| 341,030 | Great Britain | Jan. 6, 1931 |
| 433,706 | Great Britain | Aug. 14, 1935 |